Feb. 21, 1950
F. R. SWANSON
2,498,591
FASTENER
Filed April 10, 1944
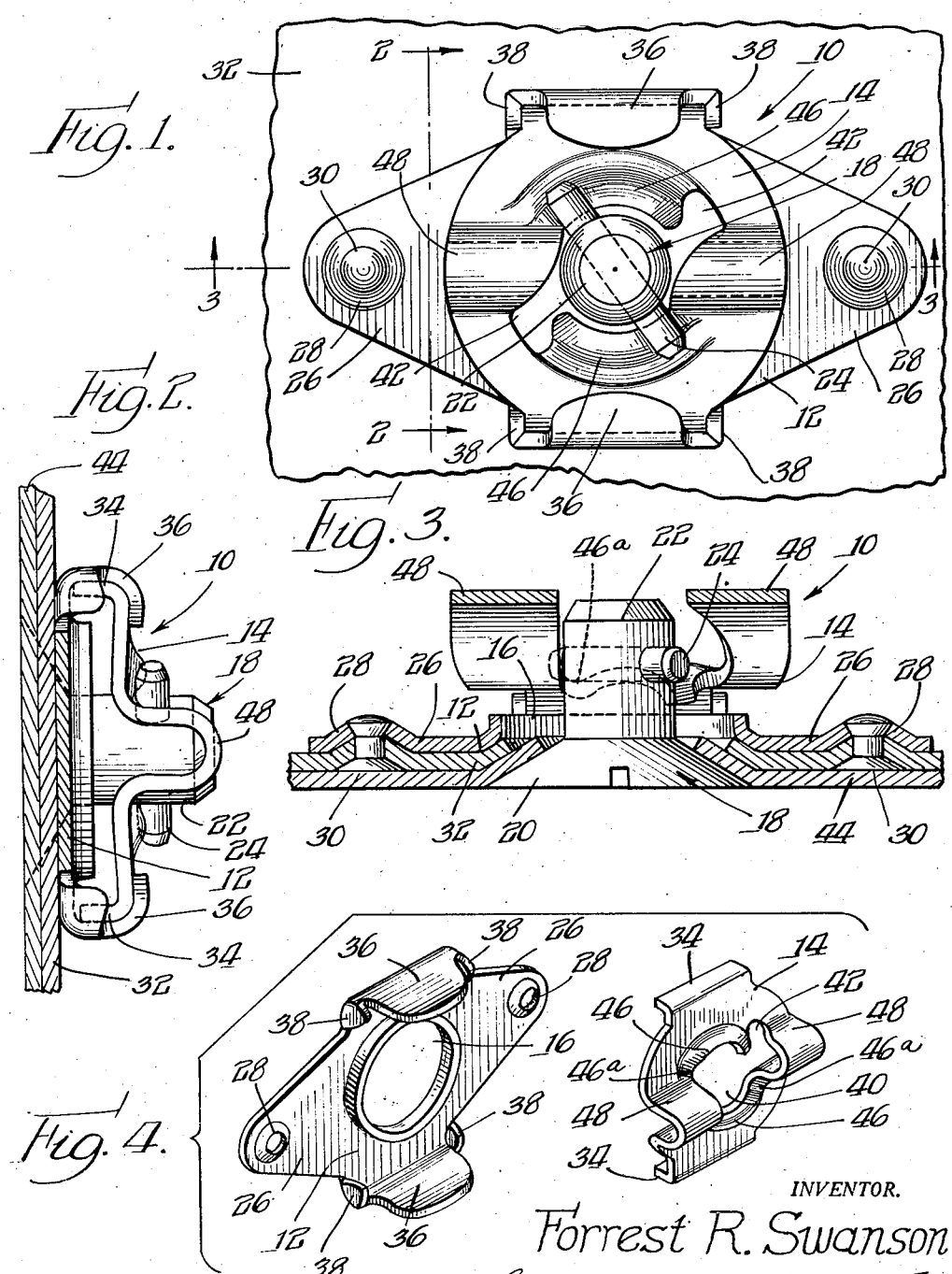
INVENTOR.
Forrest R. Swanson Patented Feb. 21, 1950

2,498,591

UNITED STATES PATENT OFFICE 2,498,591

FASTENER

Forrest R. Swanson, Chicago, Ill., assignor to Illinois Tool Works, Chicago, Ill., a corporation of Illinois Application April 10, 1944, Serial No. 530,289

4 Claims. (Cl. 24—221)

This invention relates generally to fastening devices and more particularly to fastening devices adapted to accommodate a rotatable fastening stud member.

More specifically, the invention contemplates a sheet metal fastening device for accommodating a rotary stud member, one portion of which is adapted to be attached to the surface of a work piece and another portion of which is adapted to interlock with the stud in securing a pair of work pieces together when the stud is rotated in a given direction. It is essential, in the use of fastening devices of the type referred to above, to positively limit the extent of rotation of the stud member in a tightening direction. That is to say, when a stud member, as for example a stud member equipped with lateral extensions or lugs, is initially rotated in association with a fastening device, the lug cooperates with a cam surface to bring about the tightening of the associated work surfaces. After the lug has climbed to the high point of the cam surface, means must be provided to prevent continued rotation of the lug. In other words, the lug must not be permitted to over-run the complementary cam or locking surface of the sheet metal fastener. To this end the invention contemplates the provision of a simple, yet positive, abutment formed integral with a resilient locking plate of the fastener.

Still more specifically, the present invention contemplates the provision of an abrupt abutment extending laterally of the plane of the aforesaid locking plate.

It is a further object of the present invention to provide a sheet metal fastening device of the type referred to above comprising two sheet metal parts interlocked along opposite margins so as to positively prevent lateral separation thereof and also to provide means for limiting movement of one of the parts along the surface of the other part.

The foregoing and other objects and advantages will be apparent from the following detailed description when considered with the accompanying drawing wherein—

Figure 1 is a plan view of a fastening device constructed in accordance with the teachings of the present invention.

Figure 2 is a transverse sectional view taken substantially along the line 2—2 of Figure 1.

Figure 3 is a sectional view taken substantially along the line 3—3 of Figure 1, and Figure 4 is a perspective view of the two sheet metal parts of the fastener disclosed in separated relation.

Referring now to the drawing more in detail wherein like numerals have been employed to designate similar parts throughout the various views, it will be seen that one embodiment of the present invention comprises a fastening device designated generally by the numeral 10. This fastening device 10 comprises two sheet metal parts, one constituting a base plate, or section 12, and the other a resilient locking plate, or section 14. The base plate 12 is provided with a central aperture 16 to accommodate a fastening stud member 18. This stud member 18 may be of the usual type having a head 20 at one end of a shank 22. The shank 22 accommodates a cross pin 24, the opposite extremities of which project sufficiently beyond the periphery of the stud shank to provide fastener engaging pins or lugs. The diameter of the aperture 16 is slightly larger than the over-all length of the cross pin 24.

Extending from opposite sides and formed integral with the base plate or section 12 are fastening tab portions 26. These tab portions are apertured and dimpled at 28 to accommodate fastening rivets 30. These rivets 30 serve to secure the base plate 12 to the work piece or plate 32.

The locking plate, or section 14, is provided with laterally extending members or flanges 34 which serve to maintain the plate 14 in separated relation with respect to base plate 12. These elements 34 may correctly be referred to as spacing members extending between the two sheet metal parts. It will be noted that the resilient locking plate 14 is secured against outward displacement with respect to the base plate 12 by flange members or means 36 which are formed integral with and extend laterally of the base plate. These flange members 36 are bent over adjacent margins of the locking plate 14, as clearly illustrated in Figure 2. The shifting of the locking plate along the base plate 12 is also limited by abutment members or protuberances 38, which are formed integral with and project outwardly from the base plate 12. In certain instances it may be desirable to permit certain limited movement of the locking plate 14 with respect to the base plate 12 to facilitate registration of the central aperture 40 in the locking plate with the entering extremity of the stud shank 22.

It will be noted that the locking plate 14 is provided with cross pin receiving recesses 42 which radiate from the central stud receiving aperture 40. The stud is normally carried by the work piece, or plate 44, as illustrated in Figure 3.

As the stud shank is brought into registration with the aperture 16 of the base plate 12 the projecting extremities of the cross pin 24 are moved into registration with the apertures 42. Rotation is then imparted to the stud by the application of a suitable turning tool or screw driver in a counter-clockwise direction, as viewed in Figure 1. This causes the cross pin to move from a low to a high point of an arcuate cam surface 46 provided on the locking plate 14 adjacent to the central aperture 40 thereof. This turning of the stud causes the locking plate 14 to be sprung or flexed toward the base plate, thereby exerting a strong clamping force to secure the work pieces 32 and 44 together. The cross pin ultimately reaches a detent 46a in the vicinity of the high point of the cam surface 46. The spring action of the plate 14 is such as to resiliently maintain the cross pin and detent in interlocked relation and thus counteract any tendency for the stud to rotate toward its unlocked position.

Particular attention is directed to U-shaped abutments 48 which are formed by abruptly bending the central portions of the locking plate outwardly. These U-shaped sections provide rigid, positive stops or abutments to prevent rotation of the cross pin beyond the locked position shown in Figure 1. These U-shaped abutments or sections 48 are of considerable height and hence positively preclude any possibility of the stud cross pin climbing over the tops thereof. It is very important in the use of fasteners of the type disclosed herein that the cross pin be prevented from over-running its locked position and the above mentioned abutments 48 provide very effective means for accomplishing this result.

From the foregoing, it will be apparent that the invention contemplates a fastening device of extremely simple, yet very practical, construction. The two-piece arrangement presents certain advantages both from the standpoint of manufacture and use. The two parts may be secured together as a unit without employing expensive methods of assembly and both parts may be economically produced from flat sheet stock. By having the stud locking section, or plate 14, formed separate from the base plate the U-shaped abutment portions may be very conveniently and economically formed from the stock of the locking plate. These U-shaped abutments 48, as previously pointed out, positively eliminate over-running of the cross pin when it is turned to its final locked clamping position. It will also be clear from the foregoing description that the arrangement of the fastening tabs 26 is such that no shearing stresses will be experienced by the rivets 30. That is to say, that none of the stresses experienced by the locking plate are transmitted to the rivets.

While for purposes of illustration a specific embodiment of the invention has been disclosed, it will be apparent that other changes and modifications may be made without departing from the spirit and scope of the invention.

The invention is hereby claimed as follows:

1. A fastening device for detachably securing work pieces together including a spring locking plate centrally apertured to accommodate a fastening stud, integral spacer flanges extending laterally from opposite margins of said plate, the central portions of said plate on each side of said aperture being laterally flexible, a base plate having a stud accommodating aperture in alignment with and normally spaced axially from the aperture in said spring locking plate, opposite marginal flanges on said base plate adjacently superimposing the flanges of said spring plate and abutments on said base plate engaging the opposite ends of the flanges of the spring plate to secure said plates against axial and lateral separation, and sections of said base plate adapted to be secured to a work piece, portions of said spring plate in the vicinity of the aperture thereof presenting surfaces for cooperating with a stud member to cause the central portion of said spring plate to be stressed laterally toward the base plate when the stud and locking plate are relatively rotated in a given direction.

2. A fastening device for detachably securing work pieces together in accordance with claim 1, wherein said spring plate consists of opposed side portions having stud engaging surfaces on opposite sides of the plate aperture, and intermediate U-shaped portions connecting said side portions to provide abutments for said lugs and to provide for relative yieldability of said side portions of the spring plate.

3. A fastening device for detachably securing work pieces together including a spring locking plate centrally apertured to accommodate a fastening stud having lateral lugs, the central portions of said locking plate on each side of said aperture being laterally flexible, said spring plate consisting of opposed side portions having stud engaging surfaces on opposite sides of said aperture, and intermediate U-shaped portions connecting said side portions, to provide an abutment for the lateral lugs of a stud and to provide for relative yieldability of the opposed side portions of the locking plate, a base plate having a stud accommodating aperture in alignment with and normally spaced axially from the aperture in said spring locking plate, opposite marginal flanges for maintaining said locking plate and base plate in spaced relation, and sections of said base plate adapted to be secured to a work piece.

4. A fastener device for detachably securing work pieces together comprising a spring locking plate centrally apertured to accommodate a fastening stud having lateral lugs, the central portions of said locking plate being laterally flexible and presenting opposed side portions having stud engaging surfaces on opposite sides of the aperture, and intermediate U-shaped portions connecting said side portions to provide abutments for said lugs and to provide for relative yieldability of said opposed side portions when said side portions are stressed laterally toward a work piece as an incident to relative rotation in a given direction between said stud and plate, and means for mounting said plate upon and in spaced relation to a work piece.

FORREST R. SWANSON.

REFERENCES CITED

The following references are of record in the file of this patent:

UNITED STATES PATENTS

| Number | Name | Date |
| --- | --- | --- |
| 2,308,695 | Johnson | Jan. 19, 1943 |
| 2,324,268 | Poupitch | July 13, 1943 |
| 2,327,331 | Pender | Aug. 17, 1943 |
| 2,345,326 | Churchill | Mar. 28, 1944 |
| 2,389,121 | Churchill | Nov. 20, 1945 |
| 2,413,510 | Luce | Dec. 31, 1946 |
| 2,414,272 | Poupitch | Jan. 14, 1947 |